US008196059B2

United States Patent
Chen et al.

(10) Patent No.: US 8,196,059 B2
(45) Date of Patent: Jun. 5, 2012

(54) SWITCH AND ON-SCREEN DISPLAY SYSTEMS AND METHODS

(75) Inventors: Sun-Chung Chen, Shijr (TW); Chien-Hsing Liu, Shijr (TW); Wei-Min Huang, Shijr (TW)

(73) Assignee: Aten International Co., Ltd., Shijr (TW)

( * ) Notice: Subject to any disclaimer, the term of this patent is extended or adjusted under 35 U.S.C. 154(b) by 900 days.

(21) Appl. No.: 12/098,305

(22) Filed: Apr. 4, 2008

(65) Prior Publication Data

US 2008/0250350 A1 Oct. 9, 2008

Related U.S. Application Data

(60) Provisional application No. 60/910,638, filed on Apr. 6, 2007.

(51) Int. Cl.
  *G06F 3/14* (2006.01)
  *G06F 3/17* (2006.01)

(52) U.S. Cl. ........ 715/778; 710/305; 345/173; 345/502; 709/225; 713/1; 707/1; 455/423

(58) Field of Classification Search .......... 715/200–277, 715/700–867; 700/701–866; 709/201–229; 705/50–79; 345/30–111, 173, 502; 707/1–10, 707/100–104.1; 455/423; 713/1
See application file for complete search history.

(56) References Cited

U.S. PATENT DOCUMENTS

| | | | |
|---|---|---|---|
| 5,721,842 A | 2/1998 | Beasley et al. | |
| 5,884,096 A | 3/1999 | Beasley et al. | |
| 5,937,176 A | 8/1999 | Beasley et al. | |
| 6,112,264 A | 8/2000 | Beasley et al. | |
| 6,345,323 B1 | 2/2002 | Beasley et al. | |
| 6,557,170 B1 | 4/2003 | Wilder et al. | |
| 6,609,034 B1 | 8/2003 | Behrens et al. | |
| 7,113,978 B2 | 9/2006 | Beasley et al. | |
| 7,426,542 B2 | 9/2008 | Rothman et al. | |
| 7,441,063 B2 * | 10/2008 | Tseng et al. | 710/305 |
| 7,479,949 B2 * | 1/2009 | Jobs et al. | 345/173 |
| 7,822,901 B2 * | 10/2010 | Tseng et al. | 710/305 |
| 2002/0054029 A1 | 5/2002 | Glancy et al. | |
| 2005/0101314 A1 * | 5/2005 | Levi | 455/423 |
| 2005/0289110 A1 * | 12/2005 | Giampaolo et al. | 707/1 |
| 2006/0085627 A1 * | 4/2006 | Noorbakhsh et al. | 713/1 |
| 2006/0116023 A1 | 6/2006 | Spitaels et al. | |
| 2006/0267990 A1 * | 11/2006 | Rogers et al. | 345/502 |
| 2007/0118651 A1 * | 5/2007 | Giampaolo et al. | 709/225 |
| 2008/0122796 A1 * | 5/2008 | Jobs et al. | 345/173 |
| 2008/0174570 A1 * | 7/2008 | Jobs et al. | 345/173 |

* cited by examiner

*Primary Examiner* — Ruay Ho
(74) *Attorney, Agent, or Firm* — Chen Yoshimura LLP

(57) ABSTRACT

A system with switch and on-screen display function includes a display device and a switch device. The display device includes a display panel and a display circuit. The display circuit is coupled with the display panel and is configured to control the display device. The display circuit includes an on-screen display generating circuit. The switch device is coupled with the display device and is configured to switch an access to one of at least two computers. The on-screen display generating circuit includes a signal receiving circuit, a processing circuit and a signal outputting circuit. The signal receiving circuit is configured to receive command signals from the switch device. The processing circuit generates first on-screen display menu signals for providing a first on-screen display menu in response to the received command signals. The signal outputting circuit of the on-screen display generating circuit provides the first on-screen display signals to the display panel.

23 Claims, 4 Drawing Sheets

SWITCH AND ON-SCREEN DISPLAY SYSTEMS AND METHODS

This application claims the benefit of U.S. Provisional Application No. 60/910,638, filed Apr. 6, 2007.

BACKGROUND OF THE INVENTION

1. Field of the Invention

The present invention generally relates to switch and on-screen display systems and methods. The methods and systems of the present invention may be applicable to keyboard-video monitor-mouse (KVM) switch systems.

2. Description of the Related Art

Switch systems, such as keyboard-video monitor-mouse (KVM) switch systems, are used for controlling access to two or more computers by one or more sets of user interface, such as one or more sets of a keyboard, a video monitor and a mouse. A user may use the video monitor coupled with the switch systems to obtain information regarding the computer system being accessed or the switch system being used.

Monitors, such as display panels using liquid crystal display (LCD) or other display technologies, have the primary function of displaying images. Monitors may provide certain display information for controlling the characters of monitor itself, such as the display characteristics of the monitor (e.g., adjustment of brightness, contrast, horizontal and vertical positioning). Monitors may also display video signals switched from the plurality of computers by the switch system. Commands generated for operation on controlling the plurality of computers may be sent out from peripherals (e.g., an input from the keyboard or a selection by the mouse).

An on-screen display (OSD) menu may be provided for operating a computer or a computer peripheral. For example, users may use an OSD menu to control functions such as display or KVM switch control. However, conventional designs of OSD menus in switch applications are complicated and may require multiple circuits for providing and controlling various OSD menus for separate devices. The integration of multiple circuits with overlapping controls or functions may increase cost or reduce system efficiency. Therefore, there may be a need to simplify the OSD or other circuits in some applications, such as in switching systems.

SUMMARY OF THE INVENTION

One embodiment consistent with the invention provides a system having switching and on-screen display functions. The system includes a display device and a switch device. The display device includes a display panel and a display circuit. The display circuit may be coupled with the display panel and may include an on-screen display generating circuit. The switch device is coupled with the display device and is configured to switch an access to one of at least two computers. Furthermore, the on-screen display generating circuit may include a signal receiving circuit, a processing circuit and a signal outputting circuit. The signal receiving circuit is configured to receive command signals from the switch device. The processing circuit generates first on-screen display menu signals for providing a first on-screen display menu in response to the received command signals. The signal outputting circuit of the on-screen display generating circuit provides the first on-screen display signals to the display panel.

Another embodiment of consistent with the invention provides a method for generating on-screen display menus. The display device includes a display panel and a display circuit, and the display circuit is coupled with the display panel. The method includes receiving command signals from a switch device, which is coupled with the display device, for controlling one of at least two computers coupled with the switch device, generating first on-screen display signals for providing a first on-screen display menu, and outputting the first on-screen display signals to a display panel.

The invention will become apparent from the following detailed description of the preferred but non-limiting embodiments. The following description is made with reference to the accompanying drawings.

BRIEF DESCRIPTION OF THE DRAWINGS

For the purpose of illustrating the invention, there are shown in the drawings examples which are presently preferred. It should be understood, however, that the invention is not limited to the precise arrangements and instrumentalities shown.

In the drawings.

DETAILED DESCRIPTION OF THE INVENTION

Reference will now be made in detail to the present example embodiments of the invention illustrated in the accompanying drawings. Wherever possible, the same reference numbers will be used throughout the drawings to refer to the same or like portions. As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment (as well as some alternative embodiments) of the present invention.

Figure 1:
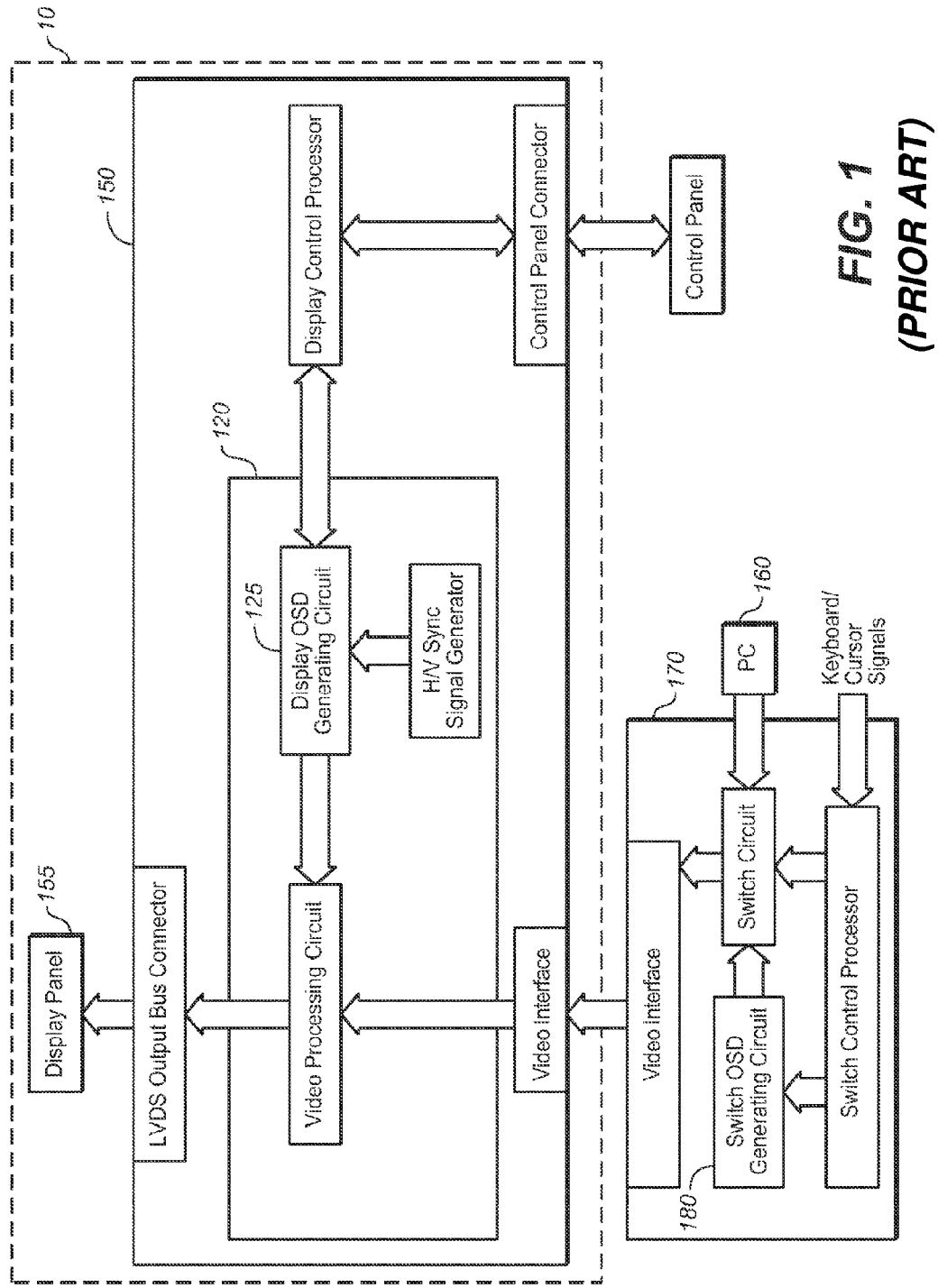
FIG. 1 is a schematic block diagram of an exemplary switch system.

Referring to FIG. 1, an exemplary switch system, such as a keyboard-video monitor-mouse (KVM) switch system, may include a display device 10 and a switch device 170. The display device 10 includes a display circuit 150 and a flat display panel 155. In order to provide an on screen display (OSD) menu for controlling the display characteristic of the display (e.g., the flat display panel 155), the display circuit 150 may include circuits configured for providing the OSD function. In one embodiment, an OSD generating circuit 125, which may be embedded within a display controller 120, may generate an OSD menu for controlling the display. As an example, the display controller 120 shown in FIG. 1 may be RTD2020 controller supplied by Realtek Semiconductor Corporation in Taiwan.

As illustrated in FIG. 1, the switch device 170 may be coupled with the display circuit 150 to allow one or more users to select and control at least one of two or more computers, such as a PC 160. To control the switch device 170, the switch device 170 may contain an OSD generating circuit, such as an OSD generating circuit 180. One example of an OSD generating circuit is MTV021 controller supplied by Myson Century, Inc. of Taiwan. The OSD generating circuit 180 may generate display signals containing or providing on-screen display menu or menus on the flat display panel 155. As an example, the on-screen display menu may identify or display the ports on, or the computers coupled with, the switch device 170 and allow an user to switch his or her access to one or more of the computers or control other aspects of the switch device operations.

In one example, the OSD generating circuit 180 is embedded within the switch device, and the circuit design of the OSD generating circuit 180 may be configured to accommodate various display devices supplied by different manufacturers with various settings and characteristics. In some instances, the OSD generating circuit 180 might not be able to provide the best or favorable display effects with certain display devices due to compatibility issues or restrictions. Furthermore, because the circuits of the switch device 170 may be more complex than that of the display device 10, the circuit design of adding the OSD generating circuit 180 to the switch device 170 may, in some applications, pose additional challenges, such as signal interference, noises, and signal instability issues caused in the proximity of other circuits of a switch device.

Figure 2:
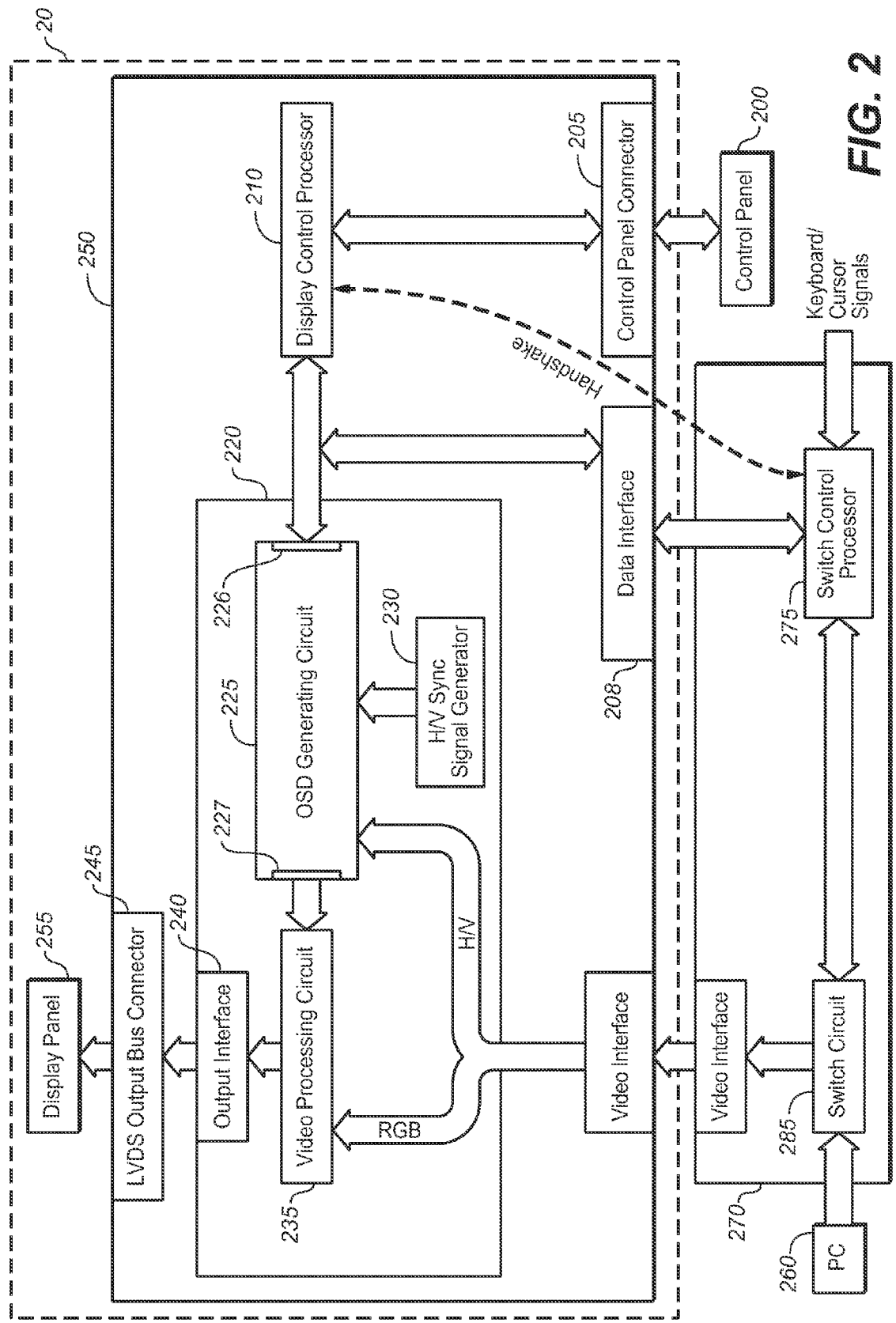
FIG. 2 is a schematic block diagram of a switch system in an embodiment consistent with the present invention.

FIG. 2 is a schematic block diagram of a KVM switch system in an embodiment consistent with the invention. Referring to FIG. 2, the switch system may provide two sets of OSD menus using one OSD generating circuit, which may be embedded within a display controller. As shown in FIG. 2, a display device 20 may include a flat display panel 255 and a display circuit 250. The display circuit 250 includes a display controller 220 and a processor, e.g., a display control processor 210. In some embodiments, the display control processor 210 may be the MTV512 controller supplied by Myson Century, Inc. of Taiwan, but the invention is not limited thereto. As an example, the display controller 220 may include an OSD generating circuit 225, a video processing circuit 235, and an H/V sync signal generator 230. A switch device 270 may be coupled with the display device 20 and may include a switching circuit 285 and a switch control processor 275.

In this embodiment, two or more OSD menus, separately used for controlling the display device 20 and the switch device 270, may be generated by a single OSD generating circuit, such as the OSD generating circuit 225. In one example, the display device 20 may provide an OSD menu for controlling the characteristics of the display itself (e.g., the flat display panel 255). VGA video signals generated by the PC 260 may include RGB (Red, Green, and Blue) signals and horizontal/vertical related signals. These signals may be directed from the PC 260 through the switch device 270 to the display controller 220. To instruct the monitor to return the beam to the left side or to instruct the monitor to start displaying a new image or a new frame, horizontal sync or vertical sync signals are generated by the H/V sync signal generator 230 and provided to the OSD generating circuit 225. The control commands for triggering and controlling the OSD menu to provide display characteristics may come from a control panel 200, such as a panel of buttons other user control interface for a user to operate. The control panel 200 may be coupled with the display control processor 210 through a control panel connector 205. The control commands produced by the control panel 200 may be transmitted to the display control processor 210 via a communication interface, such as an I$^2$C bus or a host bus. Accordingly, the OSD menu for controlling the display characteristics may be generated by the OSD generating circuit 225, based on the control commands from the display control processor 210 through a signal receiving circuit 226 of the OSD generating circuit 225. The output of the OSD generating circuit 225, i.e., the on-screen display signals, may be directed to the video processing circuit 235 through a signal outputting circuit 227 of the OSD generating circuit 225. The video processing circuit 235 then may output the display signals, such as low voltage differential signaling (LVDS) signals, through an output interface 240 of the display controller 220, an LVDS output bus connector 245 and/or a LVDS bus to the flat display panel 255.

In this embodiment, other OSD menus, such as an OSD menu for operating the switch system, are also generated by the OSD generating circuit 225. For generating and controlling the OSD menu to operate the selected computers (e.g. the PC 260) on the switch system side, a processor within the switch device 270 (e.g., the switch control processor 275) may receive OSD commands from a keyboard and/or cursor control device, and then may supply those OSD commands to the OSD generating circuit 225 through a data interface 208 of the display circuit 250 and the signal receiving circuit 226 sequentially. The OSD commands may be transmitted to the OSD generating circuit 225 via a communication interface, such as the I$^2$C bus or the host bus.

In one embodiment, the display control processor 210 and the switch control processor 275 may communicate with each other and may do so by exchanging handshake signals to allow the cooperation of the two and in some instances avoid generating interfering commands or data signals at the same time. In one embodiment, the display control process 210 and the switch control processor 275 may have a master-slave relationship. For example, the switch control processor 275 may serve as a master controller while the display control processor 210 serves as a slave controller, or it may be the other way around. There are various possibilities with the implementation of the cursor control device and display device. For example, the cursor control device could be a trackball, graphics tablet, joystick, touchpad, mouse, etc. The display device can be a touch screen device, a display that also receives inputs by fingers, stylus, or laser pointer, or some other display device. Also, the flat display panel 255 may be any type of display device or monitor, such as a CRT monitor, liquid crystal display (LCD) panel or organic light emitting diode (OLED) panel. The operation of the OSD menus can be achieved via various user control interfaces, such as a keyboard, a mouse, a joystick, a trackball, a touch screen device, other input-sensing or interactive displays, etc.

Figure 3:
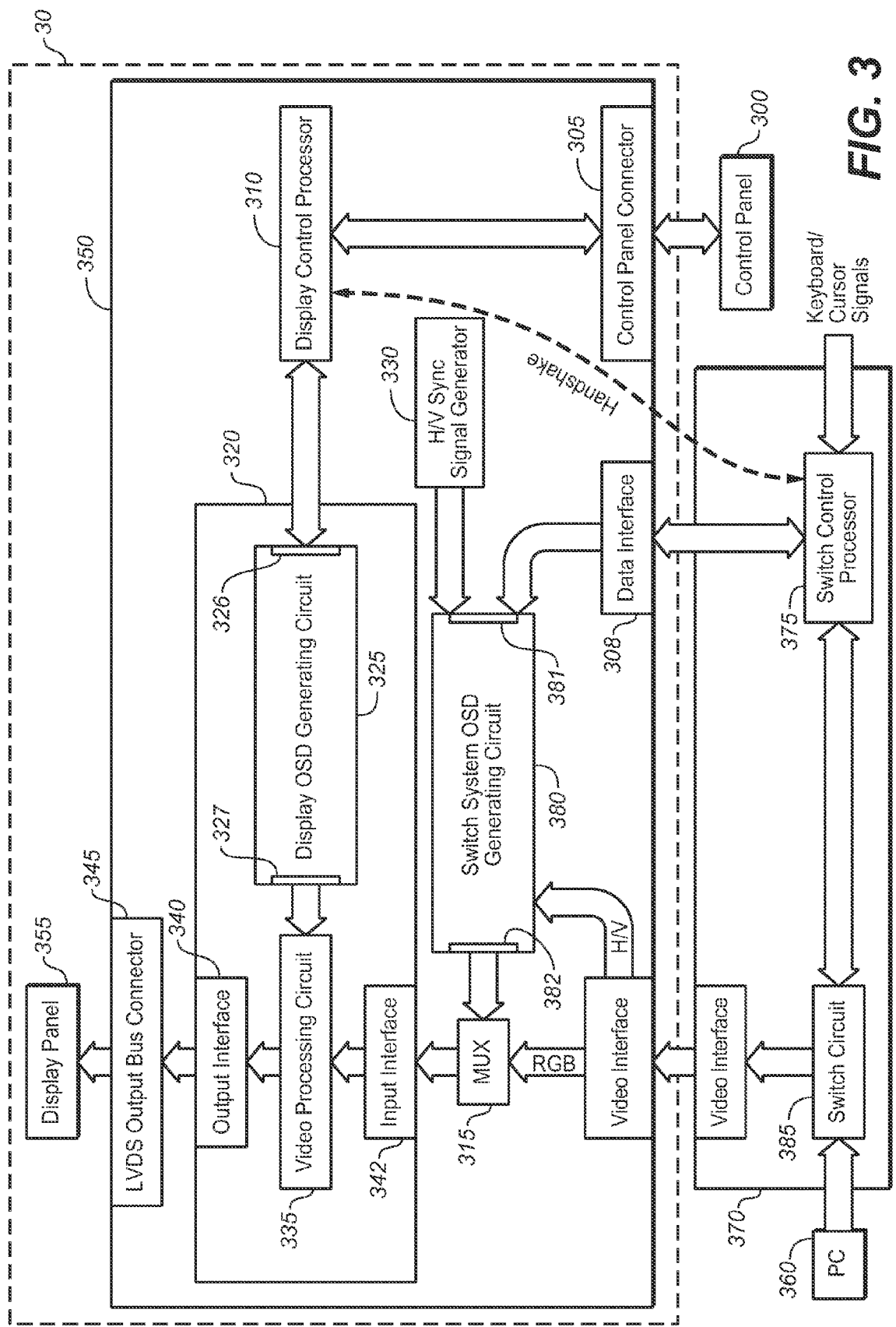
FIG. 3 is a schematic block diagram of a switch system in another embodiment consistent with the present invention.

FIG. 3 is a schematic block diagram of a KVM switch system in another embodiment consistent with the invention. Referring to FIG. 3, the switch system may provide two OSD generating circuits in a display circuit 350 associated with a display device 30. The display device 30 includes a flat display panel 355 and the display circuit 350. In one embodiment, the display circuit 350 may include a display controller 320, a processor (e.g., a display control processor 310), a multiplexer (MUX) 315, an OSD generating circuit 380 for controlling the switch system and an H/V sync signal generator 330. The display controller 320 may include an OSD generating circuit 325 for controlling the display characteristics and a video processing circuit 335. A switch device 370 is coupled with the display device 30 and may include a switching circuit 385 and a processor (e.g., a switch control processor 375). In one embodiment, the display control processor 310 can be an MTV512 IC supplied by Myson Century, Inc. of Taiwan, but the invention is not limited thereto.

The OSD generating circuit 380 for controlling the switch system can be an MTV021 IC, also supplied by Myson Century Inc. However, various other processors or MCUs may be used depending on the applications, cost, function, and/or other design considerations.

In some embodiments, OSD menus may be generated by the OSD generating circuit 325 mounted on the display circuit 350. In one embodiment, the OSD generating circuit 325 may be embedded within the display controller 320 as shown in FIG. 3. The display device 30 may provide an OSD menu for controlling the display characteristics, based on control commands received from a control panel 300. The control commands may be output to the OSD generating circuit 325 through a signal receiving circuit 326 of the OSD generating circuit 325 by the display control processor 310. In an embodiment, the control panel 300 may transmit the control commands to the display control processor 310 via a communication interface, e.g., an I²C bus or a host bus, and may be coupled with the display circuit 350 through a control panel connector 305. The output of the OSD generating circuit 325, i.e., the on-screen display signals which provide the on-screen display menu, may be directed through a signal outputting circuit 327 of the OSD generating circuit 325 to the video processing circuit 335. The video processing circuit 335 may then output display signals, such as LVDS signals, through an output interface 340 of the display controller 320, an LVDS output bus connector 345 and/or an LVDS bus to the flat display panel 355.

Other OSD menus, such as an OSD menu for operating the KVM switch system, may also be generated in the display circuit 350 by the OSD generating circuit 380. The OSD generating circuit 380 may be coupled with the switch device 370 through a data interface 308 and may be coupled with the display controller 320 through the multiplexer (MUX) 315 and an input interface 342 of the display controller 320. In one embodiment, in order to generate the OSD menu used to control the switch system within the display circuit 350, a processor (e.g., the switch control processor 375) embedded in the switch device 370 may receive OSD commands from a keyboard and/or cursor control device and supply those OSD commands to the OSD generating circuit 380, such as sequentially through the data interface 308 and a signal receiving circuit 381 of the OSD generating circuit 380. The OSD commands may be transmitted to the OSD generating circuit 380 via a communication interface, such as the I²C bus or the host bus. VGA video signals received from a PC (e.g., PC 360) may include RGB (Red, Green, and Blue) signals and horizontal/vertical related signals. The RGB signals and horizontal/vertical related signals may be routed from the PC 360 to the MUX 315 and the switch system OSD generating circuit 380 separately. To instruct the monitor to refresh another row or to start displaying a new image or a new frame, horizontal sync or vertical sync signals are generated by the H/V sync signal generator 330 and provided to the switch system OSD generating circuit 380. According to one embodiment of the invention, the on-screen display signals generated by the OSD generating circuit 380 may be selectively output to the video processing circuit 335 through the signal outputting circuit 382 of the OSD generating circuit 380, the multiplexer (MUX) 315 and the input interface 342 of the display controller 320. The video processing circuit 335 may output display signals, such as LVDS signals, through the output interface 340 of the display controller 320, an LVDS output bus connector 345, an LVDS bus, and/or other communication interface, to the flat display panel 355.

In some embodiments, the display control processor 310 and the switch control processor 375 may communicate with each other and may do so by exchanging handshake signals to allow the cooperation of the two and in some instances avoid generating command or data signals at the same time. In one example embodiment, the switch control processor 375 may serve as a master controller while the display control processor 310 serves as a slave controller, or it may be the other way around. Under the former arrangement, the switch control processor 375 determines priority of the OSD generating circuit 325 and the OSD generating circuit 380 to generate OSD menus. In other embodiments, the display control processor 310 and the switch control processor 375 do not need to communicate with each other because the OSD menu for controlling the switch system may become the background of the OSD menu for displaying the display characteristics information of the display. As noted above, various implementations may be employed for the cursor control device, the display device, and using the display device as an input interface.

Figure 4:
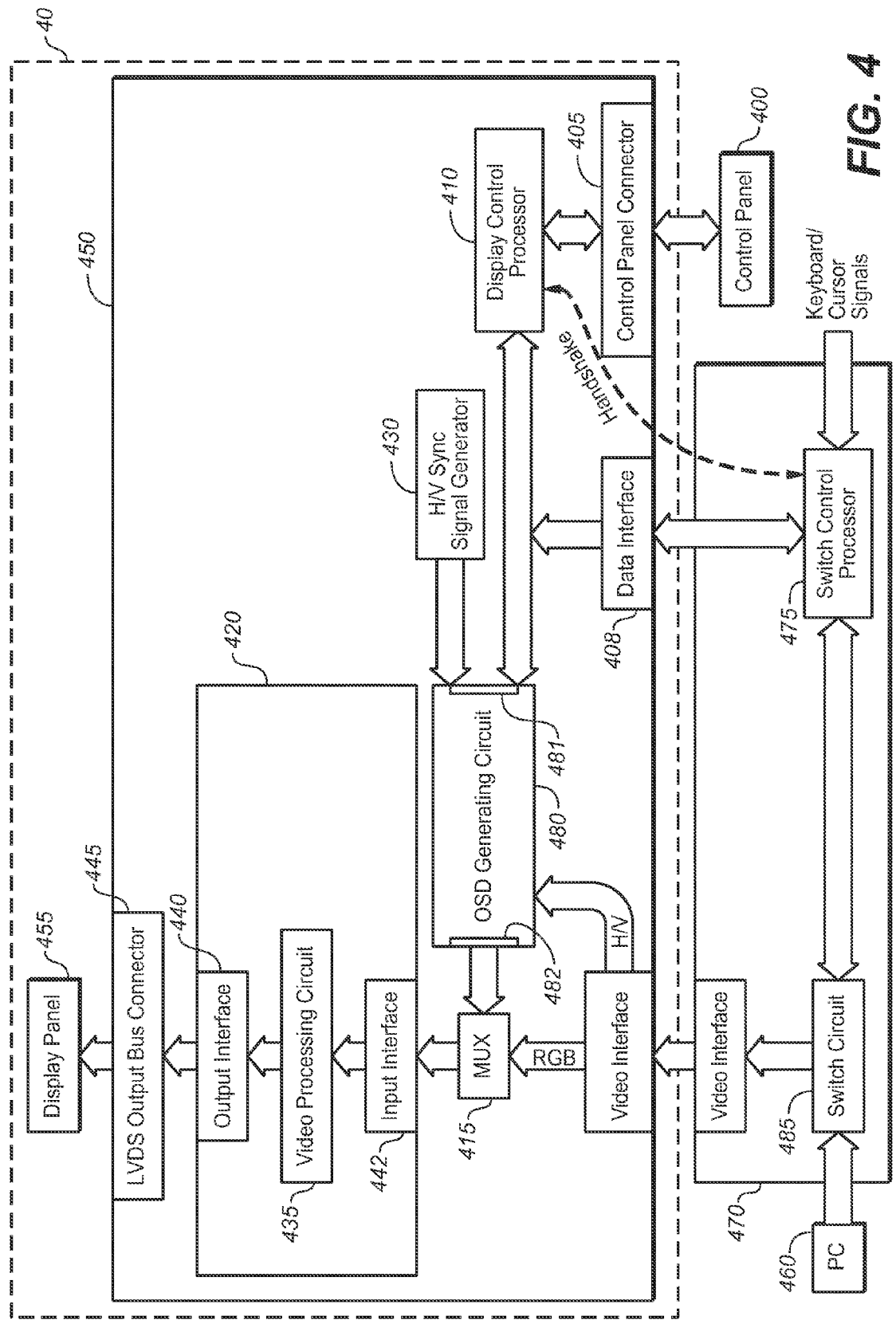
FIG. 4 is a schematic block diagram of a switch system of another embodiment consistent with the present invention.

FIG. 4 is a schematic block diagram of a KVM switch system in another embodiment consistent with the invention. Referring to FIG. 4, the switch device may provide two sets of OSD menus using one OSD generating circuit 480 embedded within a display circuit 450 associated with the display device 40. As shown in FIG. 4, a display device 40 may include a display, such as a flat display panel 455 and a display circuit 450. The display circuit 450 may include a display controller 420, a processor (e.g., a display control processor 410), a multiplexer (MUX) 415, an OSD generating circuit 480 and an H/V sync signal generator 430. The display controller 420 may include a video processing circuit 435. A switch device 470 may be coupled with the display device 40 and may include a switching circuit 485 and a processor (e.g., a switch control processor 475). In some example embodiments, the display control processor 410 can be a Myson MTV512 IC, and the OSD generating circuit 480 can be a Myson MTV021 IC, both of which are supplied by Myson Century, Inc. of Taiwan, but the invention is not limited thereto.

OSD menus may be generated by one OSD generating circuit, e.g., the OSD generating circuit 480 embedded within the display circuit 450. The OSD generating circuit 480 may be coupled with the switch device 470 through a data interface 408 and may be coupled with the display controller 420 through the multiplexer (MUX) 415 and an input interface 442 of the display controller 420. In one embodiment, the display device 40 may provide an OSD menu for controlling the display characteristics of the display (e.g. the flat display panel 455) using the OSD generating circuit 480. The control commands for triggering and controlling the OSD menu to provide the display characteristics may come from a control panel 400. The control panel 400 may be coupled with the display circuit 450 or the display control processor 410 through a control panel connector 405. The control commands produced by the control panel 400 may be transmitted to the display control processor 410 via a communication interface, such as an I²C bus or a host bus. The OSD menu for displaying the display characteristics information of the display may be generated and controlled by the OSD generating circuit 480, based on the control commands from the display control processor 410, through a signal receiving circuit 481 of the OSD generating circuit 480, to the OSD generating circuit 480. The output of the OSD generating circuit 480, i.e., the on-screen display signals, may be directed through a signal outputting circuit 482 of the OSD generating circuit 480 to the multiplexer (MUX) 415 and may be selectively output to the video processing circuit 435 through an input interface 442 of the display controller 420. The video processing circuit 435 may then output display signals, e.g.

LVDS signals, through an output interface 440 of the display controller 420, LVDS output bus connector 445 and/or an LVDS bus to the flat display panel 455.

Other OSD menus, such as an OSD menu for operating the KVM switch system, may also be generated by the OSD generating circuit 480. In one embodiment, for generating and controlling the OSD menu that may operate to select computers (e.g. the PC 460) coupled with the switch system, a processor (e.g., the switch control processor 475) within the KVM switch device 470 may supply OSD commands or data signals to the OSD generating circuit 480 through a data interface 408 of the display circuit 450 and the signal receiving circuit 481 sequentially. The OSD commands used to control the switch system may be received from a keyboard and/or cursor control device or other user control interfaces by the switch control processor 475. Those OSD commands may be transmitted to the OSD generating circuit 480 via a communication interface, such as the I²C bus or the host bus. VGA video signals received from a PC (e.g., PC 460) may include RGB signals and horizontal/vertical related signals. The RGB signals and horizontal/vertical related signals may be directed from the selected PC 460 to the MUX 415 and the OSD generating circuit 480 separately. To instruct the monitor to refresh another row or to start displaying a new image or a new frame, a horizontal sync signal for instructing the monitor to return to the next row and a vertical sync signal for instructing the monitor to display a new image are generated by the H/V sync signal generator 430 and provided to the OSD generating circuit 480. According to one embodiment of the invention, the OSD signals generated based on the OSD commands supplied by the switch control processor 475 are selectively output to the video processing circuit 435 through the signal outputting circuit 482, the multiplexer (MUX) 415 and the input interface 442 of the display controller 420. Display signals, such as LVDS signals, are routed through the output interface 440 of the display controller 420, the LVDS output bus connector 445 and/or an LVDS bus to the flat display panel 455.

In some embodiments, the display control processor 410 and the switch control processor 475 may communicate with each other and may do so by exchanging handshake signals to allow the cooperation of the two and in some instances avoid generating command or data signals at the same time. In one embodiment, the master-slave arrangements as noted above may be implemented. As an example, the switch control processor 475 may serve as a master controller while the display control processor 410 serves as a slave controller. The switch control processor 475 may determine the priority of displaying the OSD menu for the display characteristics and the OSD menu for controlling the switch system. As noted above, various implementations may be employed for the cursor control device, the display device, and using the display device as an input interface.

In describing representative examples of the present invention, the specification may have presented the method of the present invention as a particular sequence of steps. However, to the extent that the method does not rely on the particular order of steps set forth herein, the method should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method of the present invention should not be limited to the performance of their steps in the order written, and one skilled in the art can readily appreciate that the sequences may be varied and still remain within the spirit and scope of the present invention.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

What is claimed is:

1. A keyboard-video-mouse (KVM) system comprising:
a display device configured for displaying information, the display device including a display panel and a display circuit, the display circuit being coupled with the display panel and including an on-screen display generating circuit and a display control processor, wherein the on-screen display generating circuit further comprises;
a signal receiving circuit configured to receive command signals from the KVM switch device, the command signals being generated in response to a first command for controlling the KVM switch device;
a processing circuit configured to generate, responsive to the received command signals, first on-screen display signals for providing a first on-screen display menu; and
a signal outputting circuit configured to provide the first on-screen display signals to the display panel; and
a KVM switch device coupled with the display device, the KVM switch device being configured to switch an access to one of at least two computers and having a switch control processor,
wherein the display control processor of the display device and the switch control processor of the KVM switch device is able to communicate with each other by exchanging handshake signals, and
wherein the on-screen display generating circuit of the display device provides the first on-screen display menu without the need of including an on-screen display generating circuit in the KVM switch.

2. The keyboard-video-mouse (KVM) system of claim 1, wherein the first command for controlling the KVM switch device is configured to switch the access to one of at least two computers by a set of user interface coupled to the KVM switch device.

3. The keyboard-video-mouse (KVM) system of claim 1, wherein
the signal receiving circuit is configured to receive command signals in response to a second command received by a display control processor configured to control the display device, the display control processor being a portion of the display circuit;
the processing circuit is configured to generate second on-screen display signals for providing a second on-screen display menu based on the command signals from the display control processor, the second on-screen display menu being a menu for enabling a control of the display device; and
the signal outputting circuit is configured to output the second on-screen display signals to the display device.

4. The keyboard-video-mouse (KVM) system of claim 3, wherein the on-screen display generating circuit is embedded within a display controller in the display circuit and outputs at least one of the first and the second on-screen display signals to the display panel through an output interface of the display controller.

5. The keyboard-video-mouse (KVM) system of claim 3, wherein the on-screen display generating circuit is coupled with a display controller in the display circuit and outputs at least one of the first and the second on-screen display signals through the display controller to the display panel.

6. The keyboard-video-mouse (KVM) system of claim 3, further comprising:
   a first on-screen display generating circuit configured to generate the first on-screen display signals in response to the first commands received by the KVM switch device for controlling the KVM switch device to switch the access to one of at least two computers coupled with the KVM switch device, and
   a second on-screen display generating circuit configured to generate the second on-screen display signals in response to the second commands received by the display control processor for controlling the display panel,
   wherein the first on-screen display generating circuit is coupled with a display controller and the second first on-screen display generating circuit is embedded within the display controller.

7. The keyboard-video-mouse (KVM) system of claim 3, wherein the second command received by the display control processor comes from a control panel coupled with the display circuit.

8. The keyboard-video-mouse (KVM) system of claim 1, wherein the first command received by the KVM switch device comes from at least one of a keyboard and a cursor control device coupled with the KVM switch device.

9. The keyboard-video-mouse (KVM) system of claim 1, wherein at least one of the command signals and the on-screen display signals are in compliance with an I2C bus protocol.

10. A keyboard-video-mouse (KVM) system configured to provide on-screen display (OSD) and switch functions, the KVM system comprising:
   a KVM switch device configured to switch an access to one of at least two computers; and
   a display device configured to display information, the display device being coupled with the KVM switch device and including a display panel and a display circuit, the display circuit being coupled with the display panel and including a display OSD generating circuit, the display OSD generating circuit comprising:
      a signal receiving interface configured to receive command signals from the KVM switch device, the command signals being configured to control a first on-screen menu for enabling the control of the KVM switch device;
      a processing circuit configured to generate, responsive to the received command signals, first on-screen display signals for providing the first on-screen display menu; and
      a signal outputting interface configured to provide the first on-screen display signals to the display panel,
   wherein horizontal and vertical synchronization signals from the KVM switch device are sent to the on-screen display generating circuit of the display device; and
   wherein the display OSD generating circuit provides the first on-screen display menu without the need of including a switching system OSD generating circuit in the KVM switch.

11. The keyboard-video-mouse (KVM) system of claim 10, wherein the first on-screen menu is provided for enabling the switch of the access to one of at least two computers by a set of user interface coupled to the KVM switch device.

12. The keyboard-video-mouse (KVM) system of claim 10, wherein
   the signal receiving interface is configured to receive command signals in response to a second command received by a display control processor configured to control the display device, the display control processor being a portion of the display circuit;
   the processing circuit is configured to generate second on-screen display signals for providing a second on-screen display menu based on the command signals from the display control processor, the second on-screen display menu being a menu for enabling a control of the display device; and
   the signal outputting interface is configured to output the second on-screen display signals to the display device.

13. The keyboard-video-mouse (KVM) system of claim 12, wherein the display OSD generating circuit is embedded within a display controller in the display circuit and outputs at least one of the first and the second on-screen display signals to the display panel through an output interface of the display controller.

14. A method for generating on-screen display menus in a display device, the display device including a display panel coupled with a display circuit, the method comprising:
   receiving command signals from a keyboard-video-mouse (KVM) switch device, the command signals being generated in response to a first command for controlling the KVM switch device, the KVM switch device being coupled with the display device;
   generating first on-screen display signals for providing a first on-screen display menu; and
   outputting the first on-screen display signals to the display panel;
   wherein a display control processor of the display device and a switch control processor of the KVM switch device is able to communicate with each other by exchanging handshake signals.

15. The method of claim 14, wherein the first command for controlling the KVM switch device is configured to switch the access to one of at least two computers by a set of user interface coupled to the KVM switch device.

16. The method of claim 14, further comprising:
   receiving command signals in response to a second command received by a display control processor configured to control the display device;
   generating second on-screen display signals for providing a second on-screen display menu based on the command signals received from the display control processor; and
   outputting the second on-screen display signals to the display panel.

17. The method of claim 14, further comprising generating the first and the second on-screen display menus within a display controller included in the display circuit and outputting at least one of the first and the second on-screen display signals to the display panel through an output interface of the display controller.

18. The method of claim 14, further comprising generating at least one of the first and the second on-screen display signals on the display circuit and directing at least one of the first and the second on-screen display signals through display controller to the display panel.

19. The method of claim 14, further comprising:
   generating the first on-screen display signals on the display circuit in response to the commands received by the KVM switch device for controlling the KVM switch device to switch the access to one of the at least two computers coupled with the KVM switch device, and directing the first on-screen display signals through the input and output interfaces of the display controller to the display device; and generating the second on-screen display signals within the display controller in response to the commands received by the display control processor for controlling the display and directing the first on-screen display signals through the output interface of the display controller to the display panel.

20. The method of claim 14, further comprising receiving the first command received by the KVM switch device from at least one of a keyboard and a cursor control device coupled with the KVM switch device.

21. The method of claim 14, further comprising receiving the second command received by the display control processor from a control panel coupled with the display circuit.

22. The method of claim 14, further comprising routing at least one of the command signals and the on-screen display signals in compliance with an I2C bus protocol.

23. A method for provide on-screen display (OSD) menus, the method comprising:

receiving command signals from a keyboard-video-mouse (KVM) switch device, the command signals being generated in response to a first command for controlling the KVM switch device, the KVM switch device being coupled with a display device, the display device including a display panel coupled with a display OSD generating circuit;

generating first on-screen display signals for providing a first on-screen display menu; and outputting the first on-screen display signals to the display panel;

wherein horizontal and vertical synchronization signals from the KVM switch device are sent to the display OSD generating circuit; and wherein the display OSD generating circuit provides the first on-screen display menu without the need of including a switching system OSD generating circuit in the KVM switch.

\* \* \* \* \*